US008726393B2

(12) United States Patent
Macy et al.

(10) Patent No.: US 8,726,393 B2
(45) Date of Patent: May 13, 2014

(54) CYBER SECURITY ANALYZER (75) Inventors: David Macy, Weaverville, NC (US);
Leif Patrik Boo, Westerville, NC (US);
Rainer Poppenberg, Velbert (DE);
Bryan R Phillips, Chesterfield, MD (US)

(73) Assignee: ABB Technology AG, Zurich (CH)

( * ) Notice: Subject to any disclaimer, the term of this patent is extended or adjusted under 35 U.S.C. 154(b) by 243 days.

(21) Appl. No.: 13/453,344

(22) Filed: Apr. 23, 2012

(65) Prior Publication Data
US 2013/0283336 A1 Oct. 24, 2013

(51) Int. Cl.
H04L 29/06 (2006.01)
G06F 21/57 (2013.01)
G06Q 10/06 (2012.01)

(52) U.S. Cl.
CPC .......... *G06F 21/577* (2013.01); *H04L 63/1433* (2013.01); *G06Q 10/0635* (2013.01)
USPC ................................... 726/25; 726/1; 726/22

(58) Field of Classification Search
CPC .............. G06F 21/577; H04L 63/1433; G06Q 10/0635
USPC .......................................................... 726/25
See application file for complete search history.

(56) References Cited

U.S. PATENT DOCUMENTS

| | | | |
|---|---|---|---|
| 7,340,776 B2 | 3/2008 | Zobel et al. | |
| 2002/0188861 A1* | 12/2002 | Townsend | 713/200 |
| 2004/0117624 A1 | 6/2004 | Brandt et al. | |
| 2005/0102534 A1 | 5/2005 | Wong | |
| 2006/0117388 A1* | 6/2006 | Nelson et al. | 726/25 |
| 2006/0191007 A1 | 8/2006 | Thielamay | |
| 2007/0100643 A1 | 5/2007 | Paulus et al. | |
| 2010/0241478 A1* | 9/2010 | Sahinoglu | 705/8 |
| 2010/0306852 A1* | 12/2010 | Adar | 726/25 |
| 2011/0119107 A1 | 5/2011 | King | |
| 2013/0067581 A1* | 3/2013 | Venketeshwar | 726/25 |

OTHER PUBLICATIONS

Kruger et al., "A prototype for assessing information security awareness", 2006, pp. 289-296.*

* cited by examiner

*Primary Examiner* — Taghi Arani
*Assistant Examiner* — Thaddeus Plecha
(74) *Attorney, Agent, or Firm* — Driggs, Hogg, Daugherty & Del Zoppo Co., L.P.A.; Patrick J. Daugherty (57) ABSTRACT An overall cyber security risk diagram is generated from a hierarchy of determined KPI's by combining a Procedures and Protocol KPI determined from values assigned to answers to questions presented to organization personnel implementing a control systems, with a Group Security Policies KPI that is determined from system-wide policy information and settings of the automation system by an automated processing device tool, and a Computer Settings KPI determined from device setting data collected from individual system devices by the automated processing device tool and relevant to cyber security. The device setting data comprises service areas unique to each device that are not assessable by review of the domain data collected and used to determine the Group Security Policies KPI. Each level of the hierarchy of determined KPI's may be used to generate a representation of relative risk of a cyber-security attribute.

20 Claims, 5 Drawing Sheets

CYBER SECURITY ANALYZER

TECHNICAL FIELD OF THE INVENTION

Embodiments of the present invention relate to assessing the cyber security level of an organization to identify weak areas through metrics determined from answers to guided questions, and from attribute data determined and acquired through automated tools.

BACKGROUND

The use of automation systems is common within many industries. The introduction of automation provides for greatly improved efficiency, quality and reliability in many areas where modern technology has been embraced. Automation systems have also improved the worker's environment by reducing monotonous tasks and giving the workers more responsibility, as well as providing higher-level jobs in the development, deployment, maintenance and running of automated processes.

The increasing use of such control systems and computers has correspondingly increased the need to securely connect such systems. Cyber-security should be considered whenever a control system is connected to any other system. Even stand-alone systems are vulnerable, as viruses can be introduced via Universal Serial Bus (USB) sticks, and people with malicious intent may gain physical access to a system and cause damage. A cyber security breach can lead to a complete automation system stop that may take time to recover from, perhaps weeks or more. Such system failure may be the result of a malicious attack, a disgruntled employee, a virus or just the result of a mistake coupled with a lack of cyber security measures.

BRIEF SUMMARY

In one embodiment of the present invention, a method includes an automated processing device tool that generates an overall cyber security Key Performance Indicator (KPI) value for an automated system from a hierarchy of determined KPI's by combining: (i) a Procedures and Protocols KPI determined from values assigned to answers to questions presented to organization personnel implementing a control systems; (ii) a Group Security Policies KPI that is determined from system-wide policy information and system settings of the automation system by an automated processing device tool; and (iii) a Computer Settings KPI that is determined from device setting data collected by the automated processing device tool that is relevant to cyber security from each of a plurality of individual system devices of the automation control system. The device setting data comprises service areas unique to each device that are not assessable by review of the domain data collected and used to determine the Group Security Policies KPI. Each level of the hierarchy of determined KPI's displays normalized scoring of a cyber-security attribute.

The answers to the questions used to determine the Procedures and Protocols KPI have are chosen from a group of two or more possible answers presented to the personnel with each of the questions, and each of the answers for any question is assigned a different point value, which in some examples is normalized to generate the KPI's. The questions are also each relevant to and belong to one of plurality of a subset category areas of an overall, procedures and protocols domain area of cyber-security, and the question KPI's are combined in each subset category area by the automated processing device tool to generate composite KPI's for each of the subset category areas, which are in turn combined into the composite Procedures and Protocols KPI.

The system-wide policy information and system settings of the automation system collected directly from the domain controller of the automation system is processed by the automated processing device tool to determine and select a predefined security policy statement for each of a plurality of different security policy attributes of the automation system as a function of compliance of the collected security policy data with a specific set of recommended security policy settings compatible with each of the individual computers in the system. Each selected security policy statement is chosen from a group of two or more possible statements determinable by the automated agent for each of the different security policy attributes, and each of statements possibly assigned for any of the security policy attributes is assigned a different point value. The values assigned to the selected statements are then used by the automated processing device tool to determine the Group Security Policies KPI.

The collected device setting data is processed by the automated processing device tool to determine and select a predefined device setting statement for each of a plurality of different individual device settings for each of the individual devices as a function of compliance of the collected device setting data with a specific set of recommended device settings that are compatible with each of the individual computers in the system. Each of the individual device setting statements is chosen from a group of two or more possible setting statements determinable for each of the different device settings. Each of setting statements possibly assigned for any of the device settings has a different point value. KPI's for each of the settings of each of the individual devices are determined by the automated processing device tool from the values of the setting statements selected, and these KPI's are also combined by the automated processing device into respective device KPI's for each of the devices. The worst of the individual computer KPI's for each of the device setting KPI's is determined and selected for representing that device setting KPI. The device setting KPI's are then combined by the automated processing device tool into the composite Computer Setting KPI.

In another embodiment, a system has a processing unit, computer readable memory and a tangible computer-readable storage device with program instructions, wherein the processing unit, when executing the stored program instructions, generally performs steps similar to the method process described above. In other embodiments an article of manufacture has a computer-readable storage medium with computer readable program code embodied therewith, the computer readable program code comprising instructions that, when executed by a computer processing unit, cause the computer processing unit to performs steps similar to the method process described above.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
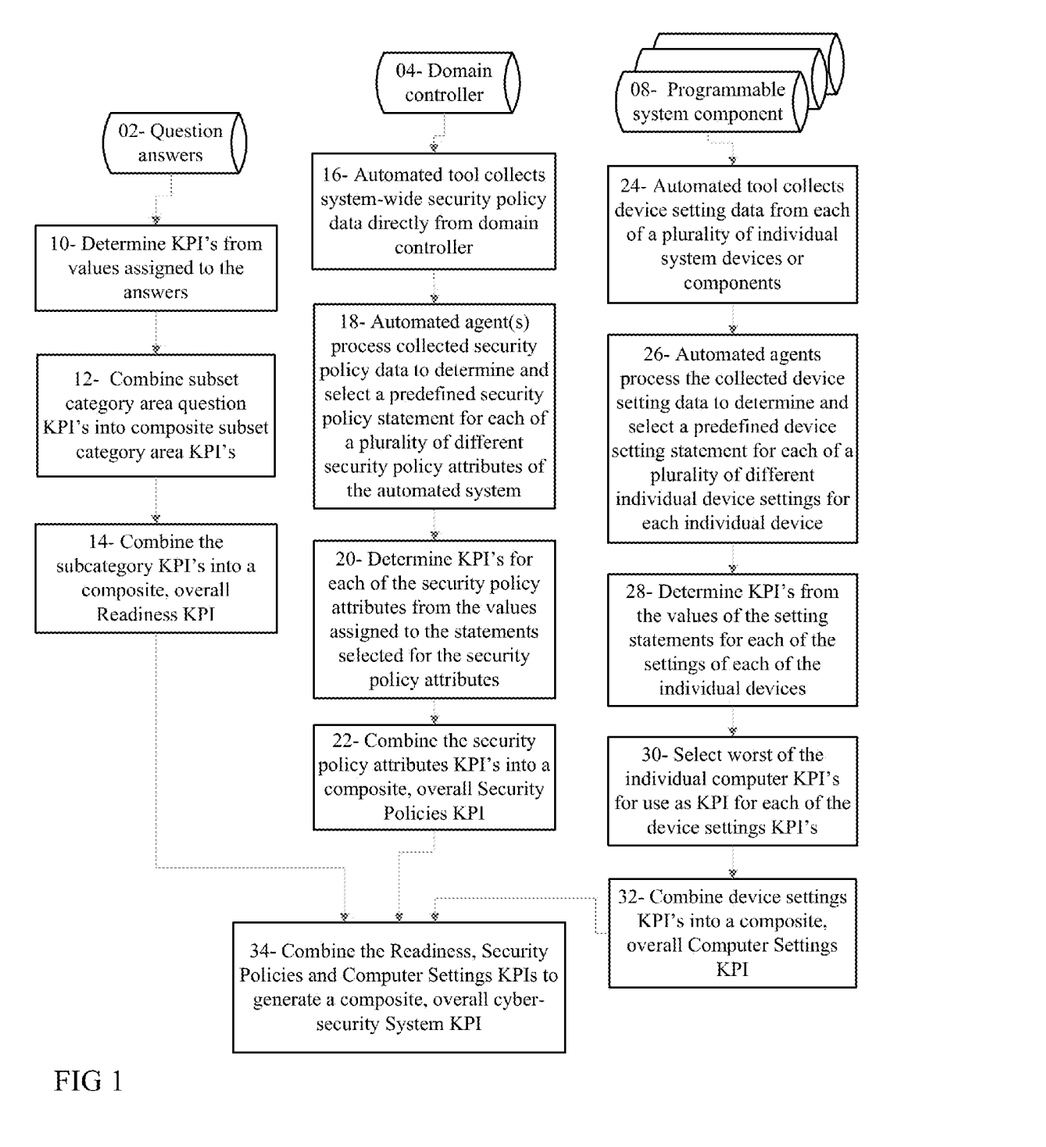
FIG. 1 is a block diagram, flow chart illustration of a method or system for determining cyber security vulnerabilities in an automated control system as a function of a hierarchical combination of Key Performance Indicator (KPI) information according to the present invention.

FIG. 1 illustrates a method or system for determining cyber security vulnerabilities in an automated control system as a function of a hierarchical combination of Key Performance Indicator (KPI) information according to the present invention. At 10 KPI's are determined from the values assigned to answers 02 to each of a plurality of questions presented to personnel in an organization implementing a control system. The answers are chosen from a group of two or more possible answers presented to the personnel with each of the questions, and each of answers is for any question is assigned a different point value.

The questions are each relevant to and belong to one of plurality of a subset category areas of an overall, Procedures and Protocol domain area of cyber-security, such as Organization, Personnel and Physical security, etc. Each question has two or more answers. Each answer is given a value that may be weighed differently depending on severity and impact on cyber security. Accordingly, at 12 the KPI's of the individual questions in each subset category area are combined into composite KPI's for each of the subset category areas.

At 16 an automated tool collects group security policy data 04, normally distributed and enforced (or in the case of a workgroup, manually configured for each computer in the system) from a domain controller, from each computer within the automation system. The security policy data comprises system-wide policy information and system settings of the automation system. At 18 the collected security policy data is processed by one or more automated agents to determine and select a predefined security policy statement for each of a plurality of different security policy attributes. Similar to the process described above with respect to the question answers, each statement is chosen from a group of two or more possible statements determinable by the tool for each of the different security policy attributes, and each of statements possibly assigned for any of the security policy attributes is assigned a different point value. Accordingly, at 20 a KPI is determined for each of the group security policy attributes from the values assigned to the statements selected for the group security policy attributes. At 22 the group security policy attributes KPI's are combined into a composite (overall, total) Group Security Policies KPI value for the automated system.

At 24 the automated tool collects device setting data from each of a plurality of individual system devices or components 06 of the automation control system 108 system (for example servers, clients, or any other device using a Microsoft Windows operating system. (Microsoft, Windows, Windows NT, and the Windows logo are trademarks of Microsoft Corporation in the United States, other countries, or both.) The device setting data comprises service areas relevant to cyber security and unique to each device (for example, firewall settings, anti-virus patch and update status etc.) that are not governed by the overall group security policies, and hence not assessable by review or analysis of the group security policy data collected and used to determine the group security policy statements at 18. At 26 the collected device setting data is processed by one or more automated agents to determine and select a predefined device setting statement for each of a plurality of different individual device settings (for example, operating systems, anti-virus software applications, etc.) for each of the individual devices.

Similar to the processes described above with respect to the question answers and group security policy statements, each of the individual device setting statements are chosen from a group of two or more possible setting statements determinable by the tool for each of the different device settings, and each of setting statements possibly assigned for any of the device settings is assigned a different point value. At 28 KPI's are determined from the values of the setting statements for each of the settings of each of the individual devices.

At 30 the worst the individual computer KPI's for each of the device setting KPI's is determined and selected for representing that device setting KPI. At 32 the individual device setting KPI's are combined into a composite (overall, total) Computer Settings KPI value for the automated system. Thus, at 34 the composite Procedures and Protocols, Group Security Policies and Computer Settings KPIs are combined to generate a composite (overall, total) cyber-security System KPI for the automated system. During the combination of individual KPI's it is always the "worst" KPI that is used, in one aspect to provide improved notice of any weakness in the cyber security defense.

Figure 2:
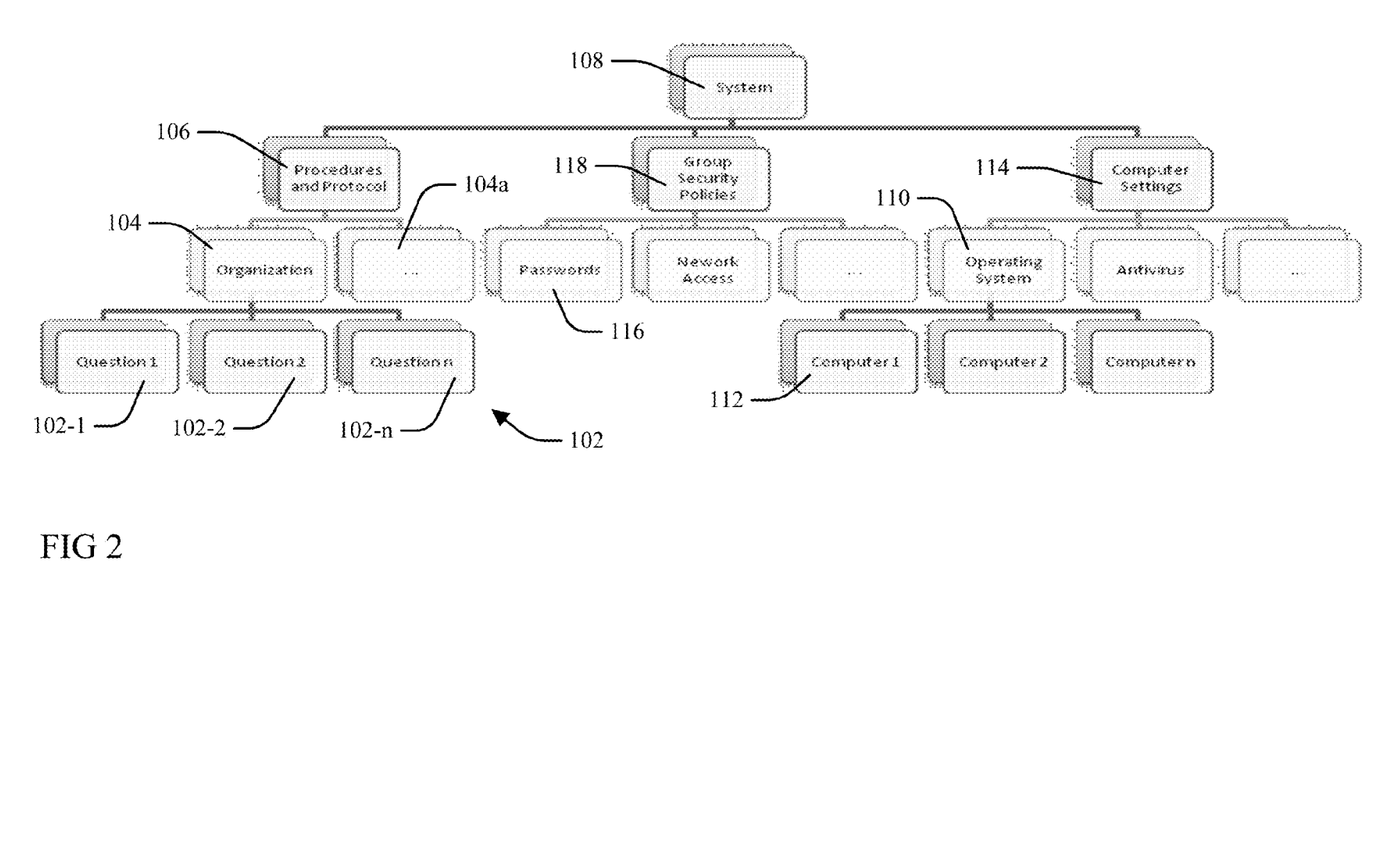
FIG. 2 is a graphical illustration of a hierarchical relationship of different KPI determination steps of the method or system of FIG. 1.

FIG. 2 illustrates the hierarchical relationship of the different KPI determination steps of the method or system of FIG. 1. The Procedures and Protocols KPI 106 is determined from answers to each of the plurality of Procedures and Protocols questions 102 presented to the control system 108, wherein the answers to the individual questions are used to generate KPI's for each question. Each of the questions belongs to a subset category area 104 of the Procedures and Protocol domain, and thus the individual question 102 KPI's are combined with the KPI's of other questions in their respective subset category areas 104 to generate the subset area KPI's. Lastly, the subset area 104 KPI's are combined into the composite (overall, total) Procedures and Protocols KPI value 106. Generally this composite KPI (as well as any other KPI) is not disclosed to or otherwise provided directly to the organization personnel of the automated system 108. Instead the KPI's are used for internal risk assessment by an expert service provider utilizing the system and process in an audit of the automated system 108, in order to automate reports and recommendations made therein.

Figure 3:
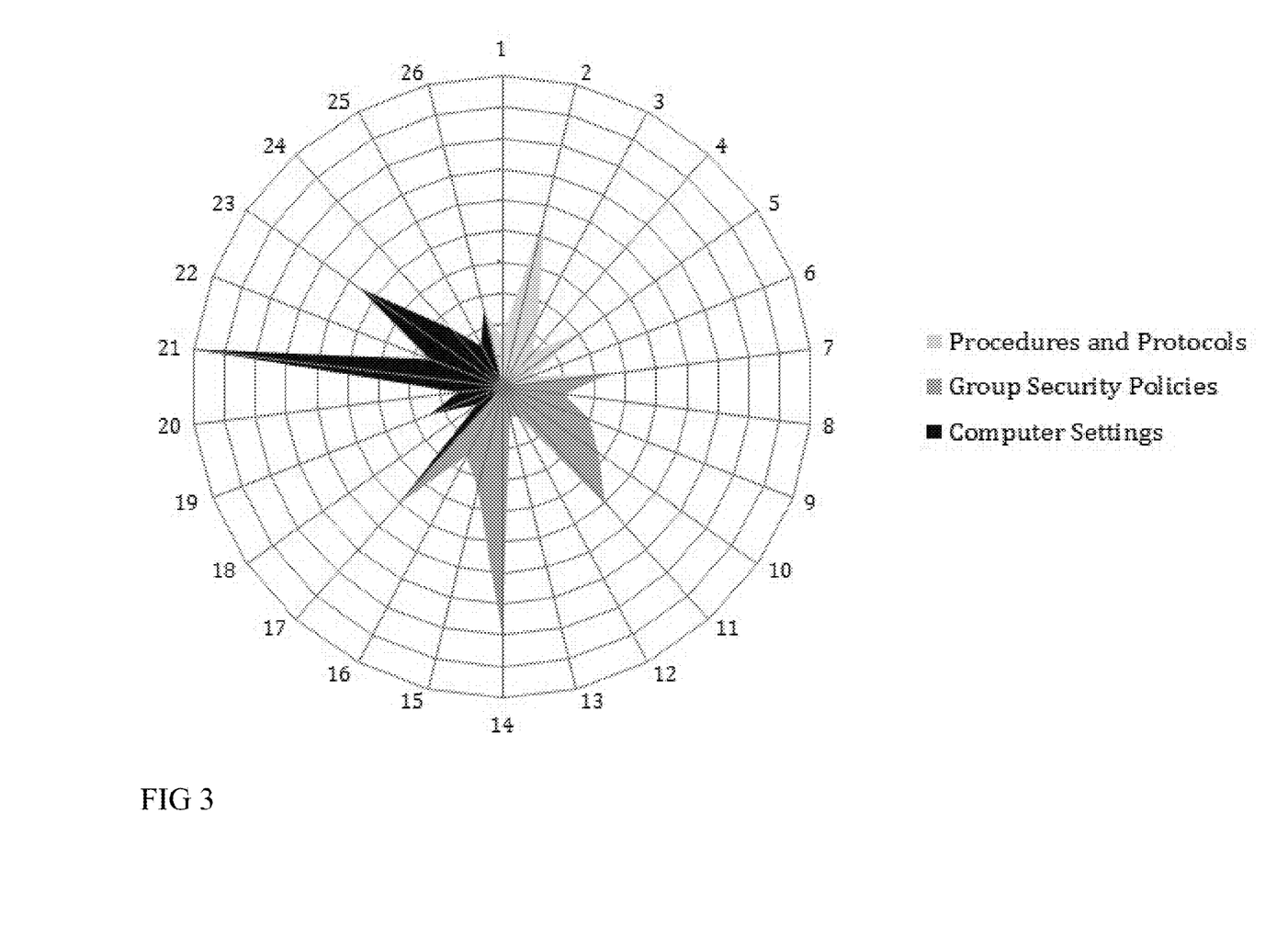
FIG. 3 is a spider graph illustrating overall cyber security risks determined from the KPI according to the present invention.

The final reports of the process provided to the organization personnel of the automated system 108 generally will visualize the overall KPI data, for example as a risk diagram in the form of a 26 segment spider diagram as illustrated in FIG. 3. The individual results that make up the report are thereby combined into an overall fingerprint, which illustrates overall security status for each of the three Procedures and Protocols, Security Policies and Computer Settings KPI groups. In this illustration and in associated reports all KPI's are converted to a risk, and the risk is generally only displayed in relation to other calculated risks. A small figure in the diagram indicates a low risk, and a completely filled diagram indicates a very cyber security result of concern. Even if the figure is very small it does not mean that the system should be considered safe. It would however indicate that the system has good basic security and that the risk of an attack is reduced.

Determination of the Procedures and Policies KPI 106 may be driven by questions 102 based on one or more security standards, for example standards provided by one or more of the International Society of Automation ISA-99, North American Reliability Commission NERC-CIP, Information Security Management System (ISMS) ISO27001/27002, and OLF 104, Information Security Baseline Requirements For Process Control, Safety And Support ICT Systems, and still other will be apparent to one skilled in the art. Such standards may guide an engineer or other service expert through a series of questions aimed to assess the cyber security level of a customer's organization, wherein the answers are used to create the KPI profiles 102, 104 and 106 that are useful to directly identify weak areas.

Other parts of the process of FIG. 2 collect data directly from the control system 108 via the automated tool. Thus, the overall Group Security Policies KPI 118 is determined from the system-wide policy information and system settings controlled from domain controllers (or manually configured in each computer in the case of a domain not being used) that effect the whole, overall automation system 108. In this process each of a plurality of security attributes KPI's 116 are generated from determining different security attributes of the system, for example password strength, security of network access or port, screensavers, and still other will be apparent to one skilled in the art. The security attributes KPI's 116 and then combined into a unitary Group Security Policies KPI 118. As before the "worst" KPI is the one being transferred to finally generate a resulting risk diagram.

The Computer Setting KPI 114 is determined as a function of the attribute KPI's 112 determined for each of individual system devices or components of the automation control system 108 system. As discussed above, these individual programmable devices feature service areas unique to the device that are not governed by the group security policies, and hence not assessable by review or analysis of the domain attributes used to determine the Group Security Policies KPI 118. These processes may be disabled, not installed or miss-configured, and thus this part of the method or system targets these areas to determine the states of these individual component attributes of system security. The automated tool collects data regarding these individual settings or attributes 110 (operating systems, anti-virus software applications, etc.) of each of said individual devices 112, to generate KPI's for each said device 112, which are combined into the Computer Setting KPI 114.

The results from the automated tool used to determine the base level KPIs at 116 and 110 may be data outputs comprising a large number of settings, often in the form of on/off statements. To prevent any one setting or device result from having an unreasonably large effect in determining impact on overall security determinations, the KPI's at each higher level are not calculated in strict Boolean fashion, but instead each setting is weighed together with all the multiple other findings providing input to a given KPI calculation, which provides a more nuanced result. The present embodiment thereby takes into account the fact that even if one area has one or more settings that are not optimal, this may not indicate that the entire system is vulnerable.

In the present embodiment the KPI values at each level of the hierarchy of FIG. 2 are generated as normalized percentage values of total possible values or scores, which may be weighted as needed. For example, for every question 102, domain attribute 116 or component attribute 110 input there are two or more answers or settings, and each possible answer or setting has a different value attached to it. For example, if one answer to a question is given a value or score of seven points out a total of 10 possible points for the question, this results in a KPI value 102 for this question of 70%, while each of the other answers may be given three or less points. In some embodiments a high value is given to answers or settings that are secure and follow applicable security standards, and a lower value, or none, is given to answers or settings that indicate a low security level. Other embodiments may use inverse valuations, with more secure answers or determined attributes given zero or lower values, and any metric scale most appropriate to the needs of a user may be selected and implemented.

In some examples relatively more important question answers or setting values are be given higher maximum point values, or otherwise have higher weighted effect in combination with other, less-important questions or settings to determine next-level KPI's 104, 118 and 112. Similarly, the next-level KPI's 104, 118 and 112 may have more points or greater weighted effect in generating a next upper level KPI 106, 108 or 114 in the hierarchy. Though such differentiated point assignments and weightings a user may fine tune the KPI's generate at any point within the system hierarchy, to increase or decrease the impact or any one areas or question answer or attribute as needed.

Figure 4:
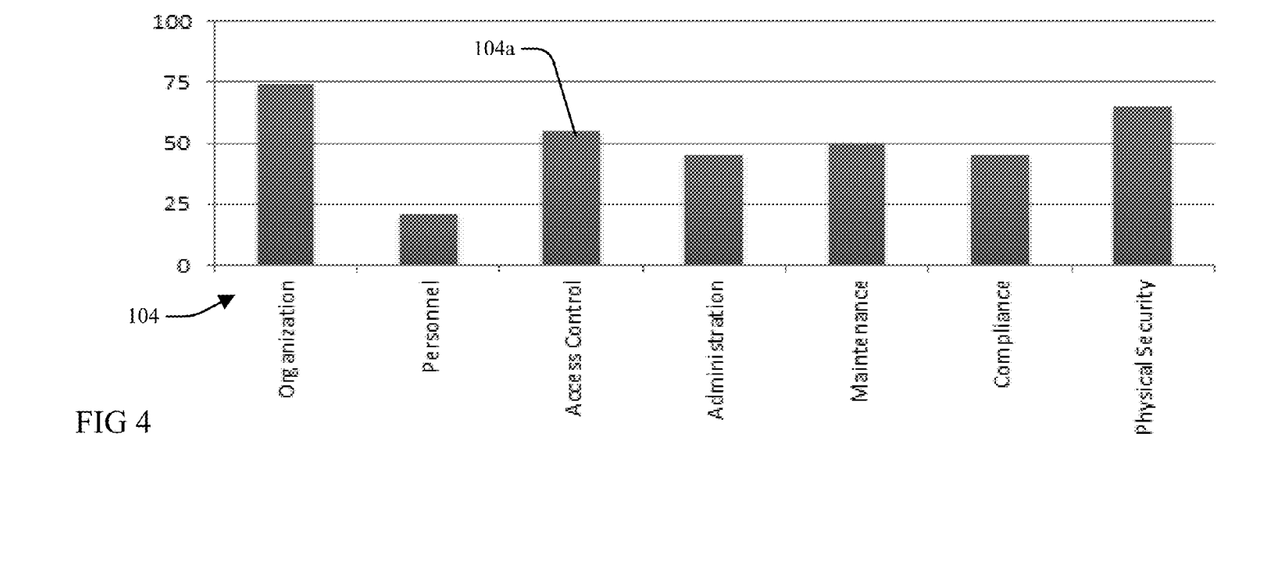
FIG. 4 is a bar graph illustrating the subset group KPI values that are combined to determine the Procedures and Protocols KPI of the example of FIGS. 1-3.
Figure 5:
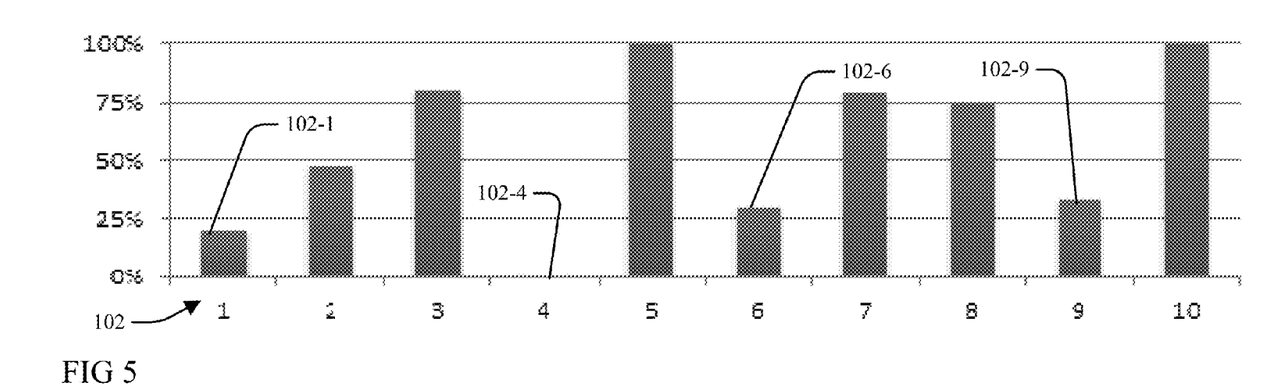
FIG. 5 is a bar graph illustrating KPI's determined for the answers to each of different Access Control subset area questions of the bar graph of FIG. 4.

The present embodiment provides opportunities for analysis based on total values within a given area or hierarchy level, as well as for drilling down to identify which of the lower-level items used to determine a specific combination KPI may be most influential or otherwise of particular concern in generating the resultant next, higher-level KPI. FIG. 4 is a bar graph illustrating the KPI's for each of the subset groups KPI 104 that are determined as combinations of their respective question KPI's 102, and which are themselves use to determine the Procedures and Protocols KPI 106. In FIG. 4 the Access Control subset area KPI 104a has a normalized value out of a total maximum of 100 points, from the total maximums of ten points each of each of the ten questions 102 shown in FIG. 5.

Review of FIG. 4 readily indicates to a security expert that the Access Control KPI 104a is just over 50 (all graphs are shown in relative numbers. The scale is always between 0 and the greatest KPI. High bar will indicate high risk) of total possible points, which may indicate a poor showing relative to an expected of standard score. One may readily determine the cause for this poor score, namely, the KPI's generated from answers to the individual questions 102-1, 102-4 102-6 and 102-9 illustrated in FIG. 5 that were used to generate the Access Control KPI 104a. In a report for this example there may be three "findings" including a short descriptive text as well as a recommendation. The expert may thus review the actual questions associated with these KPI's and the provided, scored answers and thereby determine steps that may be taken to change the answers and raise the scores of one or more of the question KPI's 102-1, 102-4 102-6 or 102-9, and thereby raise the Access Control KPI 104a.

The questions 102 of the Procedures and Protocol process at 106 enable a direct human expert assessment of the system 108 via determination of the KPI 106 and its lower-level constituent KPIs 104 and 102. This process in its own may provide general overview ratings of possible cyber security breaches in the control system or organization. Based on this Procedures and Protocol KPI 106 overview alone dedicated recommendations may be constructed that will help a customer to improve the overall cyber security situation and define a well-suited and sustainable cyber security strategy. A service expert is enabled by the present embodiment to readily and quickly identify actions that may be taken to improve cyber security by generating higher-scored answers to further iterations of generating answers to said questions by system personnel, which will improve the cyber security of the system 108, assuming that the answers with higher values are properly correlated with positive security-enhancing actions relative to the actions associated with the lower-scored answers. The present embodiment also directly incorporates the human assessment of security attributes of the system 108 (the Procedures and Protocol KPI 106) into an risk diagram that is generated as a function of the additional KPI's 118 and 114 generated from automated analyses of data acquired by automated tools, thereby leveraging both human and automated tool assessments into a more comprehensive and nuanced security profile.

1. Guided Question (Procedures and Protocol) KPI Generation.

In one example of the present embodiment the Procedures and Protocol KPI 106, information is gathered via respective questionnaire areas with respect to each of the seven categories 104 depicted in FIG. 4 (Organization, Personnel, Access Control, Administration, Maintenance, Compliance and Physical Security), thereby rating each for their cyber security vulnerability. The following sections provide illustrative but not exhaustive examples with respect to each of these categories 104.

Organization. The Organization category area questions cover general and generic measures in the organizational field, and target standard organizational measures that are required to achieve a minimum protection standard. It may be important to have a responsible person (or persons) that will focus on security regularly, such as every day. Cyber security is a moving target and the security measures must generally be constantly updated. One example question and answer: "Is the cyber security function for your enterprise network clearly defined with roles and responsibilities? [Yes (5)/No (0)]." (The numeric indicators listed with the answers here and elsewhere within this description generally indicate the points awarded to each associated answer.) Other Organization questions are directed to assessing if cyber security functions for a plant control network clearly defined with roles and responsibilities; if there is an cyber security policy for the plant control system; whether all users are aware of their cyber security responsibilities; if all cyber security functions for enterprise and plant control network are aligned; awareness of cyber security topics in control systems; numbers of people responsible for cyber security measures in a plant control system; cyber security incident response procedures; financial impact of an cyber security incident leading to production loss; degree of confidentiality of any confidential or propriety information (for example, intellectual property) that may be stored in the plant control system; and defined steps to be taken when a person with access to the system, particularly an administrator, leaves the position or the company.

Personnel. Personnel subject area questions focus on the awareness of organizational personnel of in-house cyber-related regulations, practices and procedures. Cyber security is a never-ending process. The attackers do not rest. Internal as well as external personnel generally need to have regular training in order to keep up with new risks and to keep alert with regard to many issues, such as the use of USB-sticks, social media and engineering applications, etc. An example question and answer: "Do your personnel receive cyber security awareness training? [Regularly (15)/One time (10)/Partly (5)/No (0)]." Other Personnel questions are directed to assessing if plant control security personnel receive comprehensive cyber security training; if external personnel are informed about cyber security policies; if a cyber emergency response team is trained in handling cyber security incidents; if users receive training to correctly use the control system; and if there are designated data and system owners.

Access Control. This governs which personnel are allowed to use control systems, systems components and networks. It is preferable to describe access control in detail for every person authorized to use such facilities on the basis of his/her function, in order to provide robust security. Generally, requiring each user to use their own account enhances cyber security, in one aspect enabling the use of the principle of least privilege as well as effective auditing of events and the handling of passwords. An exemplary question and answer: "Do you have generic user accounts or unique user accounts? [Unique (15)/Unique and Generic (10)/Generic (3)/Unknown (0)]."

Other Access Control questions are directed to assessing if there are policies in place that determine access control to plant control systems; how often users are required to change their passwords; if assigned system permissions are secure by default; if the workstation user interface (operator client, engineering station etc.) locks down after a time period; if there is an active audit trail for plant control system, active directory and remote connections; how data traffic is regulated to/within the plant control network, for example via DMZ including firewall, router, etc.; if any wireless solutions are in use, and their encryption; if there are any dial-up solutions in use; and if any direct connections such as a EWS or Historian on the corporate network bypass the firewall.

Administration. To allow a secure operation of systems, thorough administration of valuable information such as backups may be a key to quick and safe recovering after an incident. After a cyber-security incident it may be necessary to restore the whole control system. Without a recovery procedure such work may take much longer and may even be impossible if the right tools, setting or backup-files are missing. Even if everything needed for the recovery, the work may cause irreparably damage if certain procedures are not followed. Example: "Is there a disaster recovery procedure for the plant control system? [Yes (15)/No (0)]." Other Administration questions are directed to assessing procedures for making, storing, validating and restoring system backup and rebuilds; if all technical system documentation is up to date; and if there is a backup administrator.

Maintenance. To allow a secure operation all the parts of the control system should be properly maintained and updated. In one aspect a life cycle strategy may secure the availability of spare- and replacement parts. Since the availability of parts for older system may be limited or worse, if the system is continuously updated based on the life cycle strategy spare parts will always be available. Example question and answer: "Have you implemented a Life Cycle strategy? [Yes (15)/Partly (7)/No (0)]." Other Maintenance questions are directed to assessing if there is an cyber security service commitment from an external supplier; if audit and log files are regularly analyzed for cyber security issues; if some kind of security monitoring and diagnostics is in place; if the system is using vendor recommended anti-virus software; if vendor-validated security updates are being implemented; and if a remote connection is used for service activities or diagnostics, and with what security level.

Compliance. For nearly all fields of technology, standards and/or regulations are in force, which help to ensure that technical installations offer sufficient protection for the user and security for operations. Many different cyber security standards and best practices are readily available for purchase or download, and they may serve to help in securing a site or a system. Example question and answer: "Are you familiar with cyber security standards or regulations for compliance? [Yes (10)/Partly (7)/No (0)]." Other Compliance questions are directed to assessing compliance with cyber security standards, and whether they are mandatory, and what penalties are imposed for non-compliance; and how often security compliance audits are performed.

Physical Security. Planning physical security measures covers a range of technical and organizational provisions to protect against break-ins and similar physical risks. Generally all control system hardware should be located in a physically secure area, and'access to this area should be controlled with only authorized personnel allowed access. The area should also be protected against fires, floods etc. Example question and answer: "Is plant control hardware located in a physically secure area? [Yes (35)/Partly (10)/No (0)]."

Other Physical Security questions are directed to assessing if entrance detection is installed at areas that contain control system hardware; if work permits are distributed prior to project and service activities; if USB-ports and other input devices are disabled or locked on servers or clients.

The combined Procedures and Protocol KPI rating 106 thereby gives a general overview of the possible cyber security breaches in the control system or organization. Based on this overview dedicated recommendations may be constructed via review of low-scoring question answers that will help a customer (or a service expert to determine a strategy to recommend to a customer) to improve the overall cyber security situation and define a well-suited and sustainable cyber security strategy.

2. Automated, System-Wide Group Security Policy KPI

With respect to the Group Security Policy KPI 118, an automated tool collects data settings that are system wide and controlled from the domain controllers (or manually configured in each computer in the case of a workgroup rather than a domain). Referring again to FIG. 2, the settings 116 of the Group Security Policies 118 are checked on each computer with the automated system 108 under analysis. In one example of the present embodiment the Group Security Policy KPI 118 is determined from ten groups of settings 116: policy enforcement, passwords, user accounts, auditing of security events, recovery console, interactive logon, system and devices, network access, network security and system cryptography, and illustrative but not exhaustive examples of each are provided supra. The findings are compared to a predefined cyber security profile for the automations system in question. Each setting 116 is given a score based on thresholds of the predefined cyber security profile, and the points in each group are added and an overall score is calculated and normalized on a 0-100% scale.

Policy Enforcement. In a domain the group policies are enforced by the domain controllers, which generally update the settings in each of the connected computers on a schedule. Combined relative risk in this determination is based on the group policy enforcement. For example, with respect to timeout policies the tool determines whether or not the last security policy update from the domain controller has not been applied to all computers in the system; if not, an expert may be notified to analyze why the policies are not automatically applied and correct the problem. With respect to discrepancies, the tool determines whether or not the policy has not been updated on a threshold percentage of the members of the domain; if not, an expert may be notified to analyze why some computers do not get updated and correct the issue. With respect to "Maximum time reached", the tool determines whether or not a threshold time (for example, 30 days) has been exceeded since a last successful security policy update on all computers; if so, an expert may be notified to analyze the policy update mechanism and remedy the issue.

Passwords. Passwords settings may be assessed and points awarded for minimum and maximum password age relative to certain time period thresholds (for example, one, 45 or 90 days); minimum password length (for example, does it meet or exceed a threshold length?); password complexity; and password history size relative to a threshold.

User Account. User account settings 116 may be assessed and points awarded for lockout bad counts relative to one or more thresholds (for example, less than ten may be rated as excellent and awarded ten points, while greater than 20 rated a failure and awarded no points); whether a log-off is forced after expiration of a threshold time frame (good, high points awarded); whether administrators and guests are required to create a new, unique names (good, high points awarded), whether either may create new accounts (bad, low or no points); whether the setting limits local account use of blank passwords to console logons only (if so, high points awarded); and whether machine account password changes disabled (if so, high points awarded).

Auditing. The auditing of security events settings 116 may comprise awarding points for meeting minimum thresholds of numbers of auditing events executed with respect to system and account logon events, object accesses, privilege uses, policy changes, account managements, process tracking, and DS accesses; whether the access of global system objects is itself audited; whether the system shutdowns immediately if an administrator or service expert is unable to log security audits; and whether the use of backup and restore privileges is audited.

Recovery Console. The Recovery console settings 116 KPI may be normalized from points awarded for disabling automatic administrative logons, and from disabling or limiting removable memory media access to drives and folders, and the permission to copy data therefrom. System cryptography settings 116 KPI may be normalized from points awarded for using certain cryptography systems and standards, for example by using Federal Information Processing Standard (FIPS) compliant algorithms for encryption, hashing and signing.

Interactive Logon. Interactive logon settings 116 KPI may be assessed and points awarded relative to one or more thresholds for number of previous logons to cache (with less than a threshold awarded more points); if domain controller authentication is required to unlock; if a user is prompt to change password before expiration of a certain time period threshold; if smart cards are required; if the last user name is not displayed; and whether CTRL+ALT+DEL or a user logon is required to trigger a system shutdown may also determine points awarded.

System and Devices. System and devices settings 116 KPI may be determined from points awarded in response to determining whether an undock command is allowed without requiring a logon; whether users are prevented from installing printer drivers; whether case insensitivity is required for non-windows subsystems inputs; whether virtual memory page files are cleared at shutdown; and whether the strengthening of default permissions of internal system objects is enabled.

Network Access. The network access settings 116 KPI may be determined from points awarded in response to determining whether certain attributes or permissions are enabled or disabled, including LSA Anonymous Name Lookup; allowing storage of credentials or .NET passports for network authentication; permissions applying to anonymous users; sharing security models for local accounts; allowing anonymous enumeration of SAM accounts and shares; allowing anonymous enumeration of SAM accounts; disconnecting clients when logon hours expire; and enabling remotely accessible registry paths and sub-paths. The amount of idle time required before suspending a session may also be determined and used to award points.

Network Security. Points may be awarded in response to determining whether the following attributes or permissions are enabled, disabled or required: a clear text password ability; a "Do not store" LAN manager hash value on next password change; digitally signed communications for servers (if server agrees); digitally signed communications for servers (for example, points award if always required); send unencrypted password to connect to third-party SMB servers; digitally sign communications for workstations (if server agrees); digitally sign communications for workstation (always); digitally encrypt or sign secure channel data (always); require a strong session key; digitally encrypt secure channel data (when possible); and digitally sign secure channel data (when possible). Points may also be awarded if the following network security settings attributes meet certain thresholds with respect to levels, occurrences or timeframes: LAN manager authentication level; minimum session security for NTLM SSP based clients; minimum session security for

3. Automated, Individual Device Computer Setting KPI.

The Computer Settings KPI 114 is determined ultimately from settings KPI's 110 determined from automated tool determinations of a variety of individual device settings, which may include determined versions of an operating system, firewall, shares, hotfixes and anti-virus attributes. Illustrative but not exhaustive examples of individual device settings KPI's 110 practiced in some embodiments include operating system, anti-virus, firewall and active/configured shares attributes, which are described supra. The findings are compared to a predefined cyber security profile for the automations system in question, and points awarded based on compliance with said predefined cyber security profile.

Operating System. If the current version of an operating system is not supported, this may present a greater cyber security risk: without current security updates and patches from a manufacturer or other provider of an operating system, known security weaknesses may be exploited to breach the system. Thus, in one example the operating system settings 110 attribute is awarded points for KPI determinations only if the versions identified are still being supported (otherwise zero points are awarded). Thus the automated tool checks for and counts numbers of unnecessary and incorrectly configured services on each computer and awards (or subtracts) points accordingly.

Anti-Virus. The computers are checked to determine whether they are missing any approved hotfixes, patches (critical as well as non-critical) or anti-virus updates, and points awarded (or subtracted) accordingly.

Firewall. The software firewall is also checked on each computer by the automated tool, wherein points are awarded for a firewall KPI 110 based on whether the firewall is running or not, or is set to automatically run; and also based on how many exceptions there are to the applicable, port and application.

Active/Configured Shares. An Active/configured Shares KPI value 110 may be determined by the automated tool checking each computer for non-essential or unapproved shares; in one example finding only one unapproved/non-essential share will fail the computer (awarding zero points) for the KPI value for that computer.

Open Ports. Each computer is checked for open ports. There are always open ports, some are needed for normal functioning of the system computers (approved), while others are unneeded and which may present a security risk (unapproved). Generally there should be as few unapproved open ports as possible in order to minimize cyber security risk. Accordingly the number of open unapproved ports is determined, with risk KPI values increasing in proportion to the numbers of open unapproved ports.

Startup Items. Each computer is checked for startup items. All items that are not needed are a potential risk to the system. Accordingly the number of open unneeded startup items is determined, with risk KPI values increasing in proportion to the numbers of unneeded startup items.

Installed Applications. Each computer is checked for installed applications. All installed applications that are not needed are a potential risk to the system. Accordingly the number of unneeded installed applications is determined, with risk KPI values increasing in proportion to the numbers of unneeded installed applications.

Deploying Automated Tools

Data collection for the second (Group Security Policies KPI 118) and the third (Computer Setting KPI 114) parts of the process is dependent on the tool deployed. Deploying the automated tool generally comprises deploying a collection tool, which generally needs to be copied to one computer within the system 108, along with necessary support files. The method of copying said tool and files to an automated system 108 computer varies depending on the level of cyber security of the system, and methods may include network and USB transfer of the tool.

Data collection can be accomplished by running the tool sequentially or in parallel with other processes. Sequential is safer but will take much longer to complete, parallel is much faster but has an increased risk of disturbing the system. The mode selected depends on the system design, redundant system or not. Generally the mode selected and implemented is chosen to be the least intrusive for the particular system 108, in order that data collection may be achieved without disturbing processes running on computers, and while running at a lowest priority setting. For example, if the system 108 has redundant servers and networks, it is generally recommended to run the tool by selecting all the computers on a secondary network first and running the tool in parallel mode. When all the data from the secondary computers has been collected, the collection process may then be manually restarted and data is collected from the primary computers. However, if the system 108 is a non-redundant system (it does not have redundant computers or network structures), then the generally recommended mode for running the automated tool for data collection is sequential, wherein data collection is performed one computer after another.

In one embodiment of the present invention an Automated Security Audit Data Collection Tool designed to collect data from systems running a variety of software products comprises Collector (for example, a Security Logger or SEL100), Agent (for example, a sub program of the SEL100) and Data Browser (for example, a Security Analyzer or SEA100) applications components that are Microsoft Windows™ form solutions developed in VB.net using Microsoft Visual Studio 2010™. This illustrative example of the present invention is described more fully below, though one skilled in the art will appreciate that embodiments of the present invention are not limited to Microsoft Windows™ from solutions, and that a variety of platforms may supports such other embodiments.

Collector

The Collector provides an interface for launching a system-wide audit gathering data for the domain-driven KPI's 116, or for an audit of a current, individual machine to gather data for the device-specific KPI's 110. The Collector tool is responsible for deploying the Agent process to each machine, monitoring of these processes, and consolidation of data from each agent. The Collector tool must be supported by and run on the operating system of the automation system 108 with elevated privileges: in one aspect administrative privileges are required for remote launch of the agent process, and generally the credentials are not stored or transmitted to the Agent process. On clients, network authentication must generally be set to "Classic Network Authentication." Generally blank passwords ("string.empty") are not supported. File sharing and default administrative shares must be enabled on each node to be audited, as well as the node the collector is run from; credentials provided must allow read and write access to the default administrative shares. Simple File Sharing (for example, as provided by Windows XP) must be disabled. RPC server service must be enabled and running on each node to be audited. Server and workstation services must generally be enabled and running on each node to be audited. Certain ports in the firewall configuration should support TCP & UDP protocols for file sharing SMB and RPC: UAC in a workgroup environment is not supported unless the Filter Administrator Token registry flag is "Disabled."

The Collector application provides a user interface for users to configure and run the audit collection on a single computer or multiple computers on a network. The audit collection requires several pieces of information to successfully run audit collection procedures. With respect to administrative credentials, the Collector interface provides input for running as a "service account" user with privileges, which will allow audit collection routines to run.

The Collector also provides input of a list of computers to run the audit collection on. Manual entry of computer names is possible. Computers may be listed and presented to the user using a "Net View" command. Computers can also be selected or deselected to include in the audit collection.

The Collector also provides a user interface for answering a list of security related questions to judge the customer's level of security "readiness" with respect to the Procedures and Protocols domain. In some examples the interface is rendered using ".Net system.drawing2d" classes. Questions may also be stored in an external XML file, "questions.xml," that is located in the root application path that contains question text, answers, scoring information & reference information for multiple languages. Language can be selected at runtime, and also auto-set to the machine language.

The Collector collects user configuration parameters and sets up audit collection objects for computers that are selected to be audited, and can be run sequentially or in parallel. In a sequential launch only one computer is audited at a time: one remote agent is launched at a time and once the last remote agent is complete the next agent is launched. In parallel launch all remote agents are launched at the same time. Time to complete the audit is generally greater for the sequential launch, but multiple machines running audit at the same time could present performance issues under the parallel launch.

To monitor Agent progress on each computer being collected, a remote processor use may be displayed for each computer being collected. A user may decide to cancel audit on a machine if processor use is not acceptable, or to cancel audit on request.

Agent

In some examples all communication between the Collector and each Agent is done via Microsoft SMB (Network File) data transfer. The Collector reads file data on the Agents and each Agent publishes data to files on their local machines. Read and write operations are shared so that the Agent can write and collector read at the same time. Agent examples include the following:
 a. Status.dat—Agent writes a single line to this file which describes the current progress/status of the data collection process
 b. Errors.dat—Agent writes multiple lines to this file describing any errors in data collection.
 c. Cancel.dat—Agent monitors common path for a file with this name, if it exists the agent processes the cancel request stopping audit collection after the current method finishes.
 d. Performance.dat—Agent writes CPU utilization and Ram free bytes to this file continuously at 1-second intervals.
 e. CyberSecurityAudit.dat—Agent writes this file once collection is complete. A temporary file (guide name) is created to store an encrypted, serialized class which stores all the collected data. An encryption helper class handles file encryption, and may be AES compatible. Another class may be based on a SHA512Managed key, wherein a static key is stored in a secure string. This may all accomplished using the .Net 2.0 "System.Security.Cryptography" namespace.
 f. is Running.dat—Agent creates this file when the audit process is active and deletes it once it is complete.
 g. At.dat—Agent writes total time to complete collection to this file once collection is complete.
 h. Config.ini—This file is created by the collector and copied to each agent.

The agent reads this file on start to get several parameters, including "collect or not collect," which may be used to indicate windows update status; "string value," a comma-separated list of users which will be scanned; and "cancel audit collection," which may be triggered if CPU average use is above a threshold value (for example, for one minute prior to data collection).

The following is one illustrative but not exhaustive example of an Agent data collection flow according to the present invention:
 1. Read the config.ini file to set Agent parameters to a loadFileSettings class
  a. If set to not scan for updates, set AuditProcessor.ScanForUpdates to false.
  b. If RSOPUSERS string is not empty, set AuditProcessor.GroupPolicyUsers to the value.
 2. Start CPU and RAM monitor timer threads which runs every 1 second to monitor the CPU and RAM utilization on the machine and writes this data to the performance.dat file which is continuously read by the collector.
 3. Start Cancel Request monitor timer thread, which runs every 5 seconds to check if the collector has sent a cancel request via the cancel.dat file.
 4. Write status of "1-Checking health of machine before executing collection process" to status.dat file.
 5. Collect CPU and RAM performance data for 1 minute, after 1 minute check CPU peak % use and duration, CPU average % use, and RAM average free bytes. If any of these values exceeds configurable limits (config.ini file), the agent will stop with status "O-Cancelled" and report an error in the error.dat file reading "Agent did not start due to limited machine resources".
 6. Record audit start time
 7. Get machine name and operating system version
 8. Get installed applications
  a. Uses a combination of WMI calls (w32_product get Name, Vendor, Version) and registry uninstall keys to list all installed applications.
 9. Write status of "2-collecting general computer information"
  a. Run installed applications method to collect installed applications
  b. Run all WMIC commands
  c. WMIC.EXE
   i.—STARTUP GET caption, command
    1. Gets list of commands that run at startup.

ii.—service get Caption, startmode, startname, name, state
  1. Gets list of windows services on the machine, and the state.
iii.—Computersystem get AdminPasswordStatus, BootROMSupported, BootupState, CurrentTimeZone, DaylightInEffect, DNSHostName, Domain, DomainRole, EnableDaylightSavings Time, FrontPanelResetStatus, InfraredSupported, InstallDate, Model, NetworkServerModeEnabled, NumberOfProcessors, PartOfDomain, PowerOnPasswordStatus, PowerSupplyState, Roles, Status, SystemType, TotalPhysicalMemory, WakeUpType CSPRODUCT GET Vendor, Version
  BIOS get *
  1. Gets general computer information, mostly for display only and stores data in the SerializedXmlReport class:
iv.—cpu get *
  1. Gets information about physical cpus on the machine and stores data in the SerializedXmlReport class:
v.—ntdomain get *
  1. Gets information about the domain the computer belongs to and stores data in the SerializedXmlReport class:
vi.—OS GET *
  1. Gets operating system information (name, version)
vii.—share get caption, name, path, type
  1. Gets list of network shares on the machine.
viii. —w32_product get Name, Vendor, Version
  1. Gets list of installed applications (used in conjunction with Windows Registry to get a complete list of installed applications.
10. Write status of "3-Searching for missing security updates."
  a. Record the current state of the Windows Update service.
  b. If the Windows update service is stopped, or disabled, set the service to Manual and start it.
    i. MissingUpdates.UpdatesServiceController.StartUpdatesService( )
    ii. MissingUpdates.UpdatesServiceController. StopUpdatesService( )
  c. Check Windows Update Agent version. If Windows update agent version is less than required version, execute the Windows Update Agent updater program (published by Microsoft—WindowsUpdateAgent30-x86.exe) Timeout for this installation is 160 seconds (default, configurable property in MissingUpdates class)
    i. MissingUpdates.WuaMeetsVersionReq( )
    ii. MissingUpdates.InstallWuaAgentUpdate( )
    iii. MissingUpdates.CheckWuaVersionAndUpdate( )
  d. Run missing Microsoft hotfix report. Run in separate thread with priority of Threading.ThreadPriority.BelowNormal and timeout of 300 seconds (default, configurable property in MissingUpdates class)
11. Write status of "2-Running Policy Reports"
  a. Delete existing SECEDIT.EXE report files.
  b. SECEDIT is used to export security policy information on a windows machine.
  c. Run SECEDIT command: "secedit.exe/export/cfg %FILENAME %", read the % FILENAME % file and append to the Security Policy report object string to be parsed later.
12. Check for Antivirus software and get Virus Definition (DAT) file information. Obtain product name and version from the list of installed applications.
  a. McAfee
    i. All information is stored in the registry, AVDatDate is date of virus definitions
  b. Symantec EP
    i. Check for the DEFINFO.DAT file to obtain dat file date.
13. Write status of "3-Running Firewall Reports"
  a. Check operating system, if OS is 1SecAuditOSVersion.osServer2000, 1SecAuditOSVersion.osWindowsXP, 1SecAuditOSVersion.osServer2003 then run the following commands:
    i. "netsh.exe firewall show config enable"—for legacy OS's this command shows firewall profiles, rules, and configuration.
  b. If OS Version is any other value (Server 2008/W7/Vista) run the following commands:
    i. "netsh.exe advfirewall show allprofiles"—collect firewall profile information for all profiles.
    ii. "netsh.exe ADVFIREWALL SHOW CURRENTPROFILE"—collect firewall profile information for the active profile.
    iii. "netsh.exe advfirewall firewall show rule name=all verbose"—collect list of firewall exceptions.
  c. Add each command result to the firewall report string to be parsed later.
14. Set status of "4-Running Netstat open port Report"
  a. Run the NETSTAT command. Timeout is set at 300 seconds (default, configurable property in Netstat Collection class) Priority is Threading.ThreadPriority.BelowNormal
    i. CMD.EXE/c NETSTAT.EXE—a
15. Set status of "5-Running Group Policy Reports"
  a. If the AuditProcessor. GroupPolicyUsers variable is empty, get a list of all users and build the DomainPolicyCollection.UserReports (List (of GpResultUser)), otherwise build a list of users based on the AuditProcessor. GroupPolicyUsers comma separated string.
  b. Execute the GPRESULT COMPUTER command
  c. Execute the GPRESULT USER command for each user in the UserReports list
  d. Add each command result to the group policy object report string to be parsed later.

Dim outputReport As New AbbSecurityAuditServicesReport.XmlReportBuilder (Me._osVersionInt)
  outputReport.FirewallConfig=_firewallReport.AllowedPrograms
  outputReport.MissingUpdatesCabFile=_missingUpdatesScanner.NoUpdatesCabFile
  outputReport.WrongWuaVersion=_missingUpdatesScanner.WrongWuaVersion
  outputReport.FirewallRulesList=_firewallReport.Rules
  outputReport.DoNotScanForUpdates=Not (_settingUpdatesScan)
  outputReport.OsVersionString=_osVersion
  outputReport.MissingUpdates=Me._missingUpdatesList.ToString
  outputReport.MachineIsUpToDate=Me_missingUpdatesScanner.MachineIsUpToDate
  outputReport.InstalledApplications=_installed Appliations.ToString
  outputRepOrt.WindowsServices=WMI_SERVICE. QueryResult outputReport.SecurityPoliciesString=_seceditReport.
   SeceditReportString
outputReport.NetstatReportString=_netstatReport. NetstatReportString
outputReport.NetSharesQueryResultString=WMI_
   SHARES.QueryResult
outputReport.GeneralInfoComputerSystemString=
WMI_COMPUTERSYSTEM.QueryResult
   outputReport.GeneralInfoCpuString=WMI_CPU.QueryResult
   outputReport.
      StartupItemsString=WMI_STARTUP.QueryResult
   outputReport.GeneralInfoProductString=WMI_ CSPRODUCT.QueryResult
   outputReport.GeneralInfoNtDomainString=WMI_
      NTDOMAIN.QueryResult
   outputReport.UpdatesReportTimeout=_missingUpdates
      Scanner.OperationTimedOut
   outputReport.NetstatReportTimeout=_netstatReport.
      OperationTimedOut
   outputReport.GroupPolicyReport=_groupPolicyReport
   outputReport.ParseAll( )
   outputReport.Serialize(_workingDirectory) 'serialize the
      outputreport object to a file in the working directory
16. Parse each collected data string and place data into the XmlSerializedReport object.
17. Serialize the XmlSerializedReport object to .\ "CyberSecurityAudit.dat"
18. Encrypt the resulting file.
19. Set status of "8-Audit Complete"
   a. Collector decrypts and de-serializes the "CyberSecurityAudit.dat" file for this computer and adds it to its list of nodes in its XmlSerializedReportCollection object.

Data Browser

The Data Browser displays data collected by the Collector, and may also export information to a report template report for further modification and distribution to the customer. The Data Browser decrypts and de-serializes file objects serialized after audit collection by the Collector which contain audit data from each computer, as well as answered security questions from the questions.xml template file. The Data Browser also provides an interface for modifying the questions.xml file used by the Collector, and for modifying "hardening profiles" that are used to compare actual collected data to service expert recommended settings for proper security.

More particularly, multiple hardening profiles may allow support for multiple products. Illustrative but not exhaustive examples of hardening profiles include approved operating system security updates and service states, firewall ports and application exceptions, anti-virus software versions, vendors and DAT file versions, and recommended security policy settings. Once a hardening profile is selected for a computer, the data from that computer is compared with the data in the hardening profile. Counters for each section count the violations, and KPI's generated at the initial data levels 102, 110 and 116 based on these counters.

Figure 6:
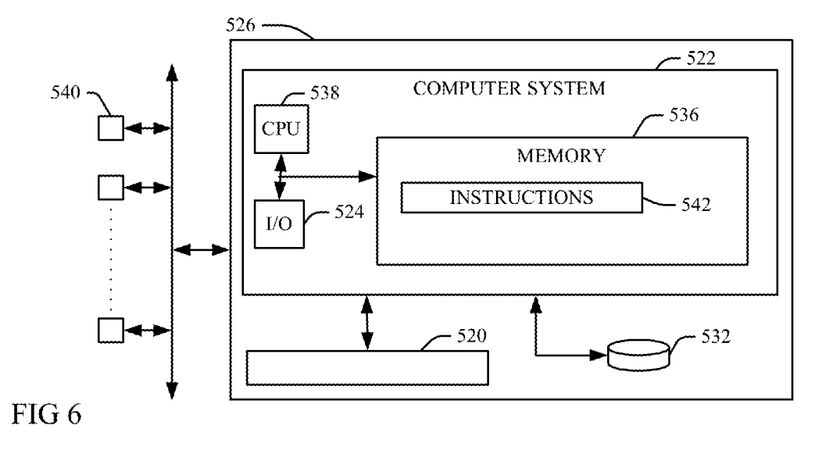
FIG. 6 is a block diagram illustration of a computerized implementation of an embodiment of the present invention.

Referring now to FIG. 6, an exemplary computerized implementation of an embodiment of the present invention includes a computer system or other programmable device 522 in communication with data sources 540 (for example, the question answers 02, domain controller data 04 or the programmable system component data 08 of FIG. 1). Instructions 542 reside within computer readable code in a computer readable memory 536, or in a computer readable storage system 532, or other tangible computer readable storage medium that is accessed through a computer network infrastructure 526 by a processing unit (CPU) 538 or an input-output (I/O) 524. Thus, the instructions, when implemented by the processing unit (CPU) 538, cause the processing unit (CPU) 538 to generate the hierarchy of KPI's illustrated in FIG. 2, in order to generate the overall cyber security KPI via the process of FIG. 1, as discussed above.

Embodiments of the present invention may also perform process steps of the invention on a subscription, advertising, and/or fee basis. That is, a service provider could offer to integrate computer-readable program code into the computer system 522 to enable the computer system 522 to generate the hierarchy of KPI's illustrated in FIG. 2, in order to generate the overall cyber security KPI via the process of FIG. 1, as discussed above. The service provider can create, maintain, and support, etc., a computer infrastructure such as the computer system 522, network environment 526, or parts thereof, that perform the process steps of the invention for one or more customers. In return, the service provider can receive payment from the customer(s) under a subscription and/or fee agreement. Services may comprise one or more of: (1) installing program code on a computing device, such as the computer device 522, from a tangible computer-readable medium device 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g., a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for determining a cyber-security risk profile key, comprising:

determining, by an automated processing device tool, question key performance indicator values from values assigned to answers to each of a plurality of questions presented to personnel in an organization implementing an automated system, wherein the answers are chosen from a group of two or more possible answers presented to the personnel with each of the questions, and each of the answers for each of the questions is assigned a different answer point value, and wherein the questions are each relevant to and belong to one of a plurality of subset category areas of an overall procedures and protocol domain area of cyber-security;

combining, by the automated processing device tool, the question key performance indicator values of the individual questions in each subset category area into separate composite question key performance indicator values for each of the subset category areas;

combining, by the automated processing device tool, the separate composite question key performance indicator values into an overall composite procedures and protocol key performance indicator value for the automated system;

collecting, by the automated processing device tool, group security policy data with respect to each of a plurality of individual computers in the automated system, wherein the collected security policy data comprises system-wide policy information and system settings of the automated system;

processing, by the automated processing device tool, the collected security policy data to determine and select a predefined security policy statement for each of a plurality of different security policy attributes of the automated system as a function of compliance of the collected security policy data with a specific set of recommended security policy settings compatible with each of the individual computers in the automated system, wherein each selected security policy statement is chosen from a group of two or more possible statements determinable by the automated processing device tool for each of the different security policy attributes, and wherein each of the security policy statements is assigned a different policy point value;

determining, via the automated processing device tool, security policy attribute key performance indicator values for each of the security policy attributes from the policy point values assigned to the selected statements for the security policy attributes;

combining, by the automated processing device tool, the security policy attribute key performance indicator values into an overall composite security policy key performance indicator value for the automated system; and generating, by the automated processing device tool, a cyber security risk profile key diagram that displays a level of cyber security risk represented by the composite procedures and protocol key performance indicator value relative to a level of cyber security risk represented by the composite security policy key performance indicator value.

2. The method of claim 1, further comprising:

collecting, by the automated processing device tool, device setting data that is relevant to cyber security from each of a plurality of individual system devices of the automated system, wherein the device setting data comprises service areas unique to each device that are not assessable by review of the security policy data collected and used to determine the security policy statements;

processing, by the automated processing device tool, the collected device setting data to determine and select a predefined device setting statement for each of a plurality of different individual device settings for each of the individual devices as a function of compliance of the collected device setting data with a specific set of recommended device settings that are compatible with each of the individual computers in the automated system, wherein each of the individual device setting statements are chosen from a group of two or more possible setting statements determinable for each of the different device settings, and each of the setting statements has a different device setting point value;

determining, by the automated processing device tool, device setting key performance indicator values from the values of the setting statements selected for each of the settings of each of the individual devices;

combining, by the automated processing device tool, the device setting key performance indicator values for each of the security settings for each device into respective device key performance indicator values for each of the devices; and combining, by the automated processing device tool, the device key performance indicator values into an overall composite computer setting key performance indicator value for the automated system; and wherein the step of generating the cyber security risk profile key diagram comprises displaying a level of cyber security risk represented by the composite computer setting key performance indicator value relative to the level of cyber security risk represented by the composite procedures and protocol key performance indicator value and relative to the level of cyber security risk represented by the composite security policy key performance indicator value.

3. The method of claim 2, wherein the questions and answers are based on one or more security standards selected from a group comprising: International Society of Automation ISA-99, North American Reliability Commission NERC-CIP, Information Security Management System (ISMS) ISO27001/27002, and Information Security Baseline Requirements For Process Control, Safety And Support ICT Systems OLF 104.

4. The method of claim 2, wherein the steps of determining the question, security policy attribute, and device setting key performance indicator values from the values assigned to answers, the values assigned to the selected statements for the security policy attributes, and from the values of the setting statements, comprises generating normalized percentage values of total possible values.

5. The method of claim 4, wherein a first of the questions has a maximum answer point value that is higher than a maximum answer point value of a second of the questions as a function of a higher importance.

6. The method of claim 4, wherein the subset category areas of the questions comprise Organization, Personal, Access Control, Administration, Maintenance, Compliance and Physical Security subset category areas.

7. The method of claim 4, wherein the different security policy attributes of the automation system comprise passwords, user accounts, auditing of security events, recovery console, interactive logon, system and devices, network access, network security and system cryptography security policy attributes.

8. The method of claim 4, wherein the different individual device settings for each of the individual devices copmprise determined versions of operating system, firewall, shares, hotfixes and anti-virus attribute settings.

9. The method of claim 4, wherein the automated processing device tool comprises a data browser component that provides an interface for:
- modifying the questions and the values that assigned to the answers for the questions;
- modifying security policy hardening profiles of the recommended security policy settings that are used by the automated processing device tool to determine and select the predefined security policy statements for each of a plurality of different security policy attributes of the automated system, and for modifying the policy point values assigned to the different security policy statements; and
- modifying computer settings hardening profiles of the recommended device settings that are used by the automated processing device tool to determine and select the predefined device setting statements for each of a plurality of different individual device settings for each of the individual devices of the automated system, and for modifying the point values assigned to the different device setting statements.

10. The method of claim 9, wherein the automated processing device tool comprises Microsoft Windows® form collector, agent and data browser components that are developed in VB.net using Microsoft Visual Studio 2010.™

11. A system, comprising:
- a processing unit in communication with a tangible computer-readable storage device;
- wherein the processing unit, when executing program instructions stored on the tangible computer-readable storage device:
- determines question key performance indicator values from values assigned to answers to each of a plurality of questions presented to personnel in an organization implementing an automated system, wherein the answers are chosen from a group of two or more possible answers presented to the personnel with each of the questions, and each of the answers for each of the questions is assigned a different answer point value, and wherein the questions are each relevant to and belong to one of a plurality of subset category areas of an overall procedures and protocols domain area of cyber-security;
- combines the question key performance indicator values of the individual questions in each subset category area into separate composite question key performance indicator values for each of the subset category areas;
- combines the separate composite question key performance indicator values into an overall composite procedures and protocol key performance indicator value for the automated system;
- collects security policy data directly from a domain controller of the automated system, wherein the collected security policy data comprises system-wide policy information and system settings of the automated system;
- processes the collected security policy data to determine and select a predefined security policy statement for each of a plurality of different security policy attributes of the automated system as a function of compliance of the collected security policy data with a specific set of recommended security policy settings compatible with each of the individual computers in the automated system, wherein each selected security policy statement is chosen from a group of two or more possible statements determinable by the automated processing device tool for each of the different security policy attributes, and wherein each of the security policy statements is assigned a different policy point value;
- determines security policy attribute key performance indicator values for each of the security policy attributes from the policy point values assigned to the selected statements for the security policy attributes;
- combines the security policy attribute key performance indicator values into an overall composite security policy key performance indicator value for the automated system; and
- generates a cyber security risk profile key diagram that displays a level of cyber security risk represented by the composite procedures and protocol key performance indicator value relative to a level of cyber security risk represented by the composite security policy key performance indicator value.

12. The system of claim 11, wherein the processing unit, when executing the program instructions stored on the computer-readable storage device, further:
- collects device setting data that is relevant to cyber security from each of a plurality of individual system devices of the automated system, wherein the device setting data comprises service areas unique to each device that are not assessable by review of the security policy data collected and used to determine the security policy statements;
- processes the collected device setting data to determine and select a predefined device setting statement for each of a plurality of different individual device settings for each of the individual devices as a function of compliance of the collected device setting data with a specific set of recommended device settings that are compatible with each of the individual computers in the automated system, wherein each of the individual device setting statements are chosen from a group of two or more possible setting statements determinable for each of the different device settings, and each of the setting statements has a different device setting point value;
- determines device setting key performance indicator values from the values of the setting statements selected for each of the settings of each of the individual devices;
- combines the device setting key performance indicator values for each of the security settings for each device into respective device key performance indicator values for each of the devices; and
- combines the device key performance indicator values into an overall composite computer setting key performance indicator value for the automated system; and
- wherein the generated cyber security risk profile key diagram displays a level of cyber security risk represented by the composite computer setting key performance indicator value relative to the level of cyber security risk represented by the composite procedures and protocol key performance indicator value and relative to the level of cyber security risk represented by the composite security policy key performance indicator value.

13. The system of claim 12, wherein the processing unit, when executing the program instructions stored on the computer-readable storage device, determines the question, security policy attribute, and device setting key performance indicator values from the values assigned to answers, the values assigned to the selected statements for the security policy attributes, and from the values of the setting statements, by generating normalized percentage values of total possible value scores.

14. The method of claim 13, wherein the processing unit, when executing the program instructions stored on the computer-readable storage device, further provides an interface for:
modifying the questions and the values that assigned to the answers for the questions;
modifying security policy hardening profiles of the recommended security policy settings that are used by the automated processing device tool to determine and select the predefined security policy statements for each of a plurality of different security policy attributes of the automated system, and for modifying the policy point values assigned to the different security policy statements; and
modifying computer settings hardening profiles of the recommended device settings that are used by the automated processing device tool to determine and select the predefined device setting statements for each of a plurality of different individual device settings for each of the individual devices of the automated system, and for modifying the device setting point values assigned to the different device setting statements.

15. The system of claim 14, wherein the processing unit, when executing the program instructions stored on the computer-readable storage device, develops Microsoft Windows™ form collector, agent and data browser components in VB.net™ using Microsoft Visual Studio 2010. ™

16. An article of manufacture, comprising:
a computer readable tangible storage device having computer readable program code embodied therewith, the computer readable program code comprising instructions that, when executed by a computer processing unit, cause the computer processing unit to:
determine question key performance indicator values from values assigned to answers to each of a plurality of questions presented to personnel in an organization implementing an automated system, wherein the answers are chosen from a group of two or more possible answers presented to the personnel with each of the questions, and each of the answers for each of the questions is assigned a different answer point value, and wherein the questions are each relevant to and belong to one of a plurality of subset category areas of an overall procedures and protocols domain area of cyber-security;
combine the question key performance indicator values of the individual questions in each subset category area into separate composite question key performance indicator values for each of the subset category areas;
combine the separate composite question key performance indicator values into an overall composite procedures and protocol key performance indicator value for the automated system;
collect security policy data directly from a domain controller of the automated system, wherein the collected security policy data comprises system-wide policy information and system settings of the automated system;
process the collected security policy data to determine and select a predefined security policy statement for each of a plurality of different security policy attributes of the automated system as a function of compliance of the collected security policy data with a specific set of recommended security policy settings compatible with each of the individual computers in the automated system, wherein each selected security policy statement is chosen from a group of two or more possible statements determinable by the automated processing device tool for each of the different security policy attributes, and wherein each of the security policy statements is assigned a different policy point value;
determine security policy attribute key performance indicator values for each of the security policy attributes from the policy point values assigned to the selected statements for the security policy attributes;
combine the security policy attribute key performance indicator values into an overall composite security policy key performance indicator value for the automated system; and
generate a cyber security risk profile key diagram that displays a level of cyber security risk represented by the composite procedures and protocol key performance indicator value relative to a level of cyber security risk represented by the composite security policy key performance indicator value.

17. The article of manufacture of claim 16, wherein the computer readable program code instructions, when executed by the computer processing unit, further cause the computer processing unit to:
collects device setting data that is relevant to cyber security from each of a plurality of individual system devices of the automated system, wherein the device setting data comprises service areas unique to each device that are not assessable by review of the security policy data collected and used to determine the security policy statements;
processes the collected device setting data to determine and select a predefined device setting statement for each of a plurality of different individual device settings for each of the individual devices as a function of compliance of the collected device setting data with a specific set of recommended device settings that are compatible with each of the individual computers in the automated system, wherein each of the individual device setting statements are chosen from a group of two or more possible setting statements determinable for each of the different device settings, and each of the setting statements has a different device setting point value;
determines device setting key performance indicator values from the values of the setting statements selected for each of the settings of each of the individual devices;
combines the device setting key performance indicator values for each of the security settings for each device into respective device key performance indicator values for each of the devices; and
combines the device key performance indicator values into an overall composite computer setting key performance indicator value for the automated system; and
wherein the generated cyber security risk profile key diagram displays a level of cyber security risk represented by the composite computer setting key performance indicator value relative to the level of cyber security risk represented by the composite procedures and protocol key performance indicator value and relative to the level of cyber security risk represented by the composite security policy key performance indicator value.

18. The article of manufacture of claim 17, wherein the computer readable program code instructions, when executed by the computer processing unit, further cause the computer processing unit to determine the question, security policy attribute, and device setting key performance indicator values from the values assigned to answers, the values assigned to the selected statements for the security policy attributes, and from the values of the setting statements, by generating normalized percentage values of total possible value scores.

19. The article of manufacture of claim 18, wherein the computer readable program code instructions, when executed by the computer processing unit, further cause the computer processing unit to provide an interface for:
  modifying the questions and the values that assigned to the answers for the questions;
  modifying security policy hardening profiles of the recommended security policy settings that are used by the automated processing device tool to determine and select the predefined security policy statements for each of a plurality of different security policy attributes of the automated system, and for modifying the policy point values assigned to the different security policy statements; and
  modifying computer settings hardening profiles of the recommended device settings that are used by the automated processing device tool to determine and select the predefined device setting statements for each of a plurality of different individual device settings for each of the individual devices of the automated system, and for modifying the device setting point values assigned to the different device setting statements.

20. The article of manufacture of claim 19, wherein the computer readable program code instructions, when executed by the computer processing unit, further cause the computer processing unit to develop Microsoft Windows™ form collector, agent and data browser components in VB.net™ using Microsoft Visual Studio 2010.™

\* \* \* \* \*